United States Patent Office 3,053,681
Patented Sept. 11, 1962

3,053,681
PROCESS FOR THE MANUFACTURE OF HARD WAXES
Josef Kaupp, Gunter Konig, Guido von Rosenberg, and Heinrich Trager, Gersthofen, near Augsburg, and Albert Thalhofer, Munich-Neuaubing, Germany, assignors to Farbwerke Hoechst Aktiengesellschaft vormals Meister Lucius & Bruning, Frankfurt am Main, Germany, a corporation of Germany
No Drawing. Filed Oct. 17, 1958, Ser. No. 767,762
Claims priority, application Germany Dec. 28, 1957
14 Claims. (Cl. 106—268)

The present invention provides a process for the manufacture of hard waxes.

In the processes that have hitherto been applied for the manufacture of synthetic ester waxes monohydric or polyhydric aliphatic alcohols are used as hydroxyl components. It is especially the use of polyhydric alcohols that enables hard waxes to be obtained by esterifying oxidation products from montan wax. These hard waxes excel with respect to the oil-binding and gloss-producing properties of the pastes prepared from them, over the montan wax acids used as starting material.

It is also known to prepare very valuable ester waxes that have excellent gloss-producing properties by reacting a saturated fatty acid having more than 18 carbon atoms with an aromatic dimethylol compound, such as dimethylol benzene, dimethylol toluene, dimethylol anisole and dimethylol naphthalene, alone or in admixture with an aromatic monomethylol and/or polymethylol compound and/or an aliphatic glycol.

The present invention provides a process for the manufacture of ester waxes that are extraordinarily hard and have very good gloss-producing properties wherein the organic acid containing more than 18 carbon atoms, preferably an acid obtained by bleaching montan wax, is reacted with an oxalkylation product corresponding to the general formula

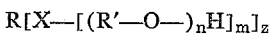

in which R is a cyclic radical, X is an atom of an atomic number within the range of 7 to 8, R' is an alkylene radical containing at least 2 carbon atoms in the chain and having a total of 2 to 4 carbon atoms, $n$ is an integer ranging from 1 to 12 and preferably from 1 to 8, $m$ is the minimum valence decreased by 1 of the atom having an atomic number within the range of 7 to 8, and $z$ means integral, greater than 1 and suitably not exceeding 4.

For example, $m$ is 1 in case X is oxygen and it is 2 when X means nitrogen since the minimum valence of nitrogen is 3.

R may represent an aromatic radical, a heterocyclic radical as well as a hydrogenation product of such a radical. The aforesaid compounds may furthermore be used in admixture with polyhydric alcohols whose hydroxyl groups are bound to aliphatic carbon atoms and separated from one another by at least 2 carbon atoms. As compounds of this kind, there may, for example, be mentioned aliphatic glycols such as ethylene glycol, propylene glycol, propane-diol- (1.2), the butane-diols, butylene glycol, pentane-diol, hexane-diol, decane-diol or mixtures of these compounds with less than the same quantity of triols such as glycerin, trimethylol propane, trimethylol ethane, butane triol and hexane triol; furthermore, there may be used aromatic dimethylol and/or polymethylol compounds such as dimethylol toluene, dimethylol xylene and dimethylol naphthalene. There may be used dimethylol- and/or polymethylol compounds of benzene, toluene, xylene, ethyl benzene, cumene, cymene, naphthalene, α-naphthyl methyl ether, nerolin, methyl naphthalene, diphenyl, anthracene, fluorene, acenaphthene, phenanthrene, anisol, phenetole, diphenyl ether, ditolyl ether, chlorobenzene, chlorotoluene, bromotoluene, nitrobenzene, nitrotoluene, nitronaphthalene, or mixtures of these dimethylol compounds or mixtures thereof with the corresponding methylol-compounds of the said substances with compounds containing 3 or more methylol groups. The para-dimethylol-compounds are especially suitable.

The group R'—O— represents in the first place the radical formed by the addition reaction of ethylene oxide with hydroxyl groups or amino groups. In addition, it stands for the grouping formed by the addition reaction of propylene oxide or butylene oxide with the aforesaid groups.

As aromatic substances which after oxalkylation, for example oxethylation, may be used as alcohol components in the process of the invention there may be mentioned pyrocatechol, resorcin, resorcins substituted by hydrocarbon radicals such as nonyl- dodecyl- or di-isobornyl-resorcin, hydroquinones, the isomeric phenylenediamines, dihydroxy-diphenyls, diamino-diphenyls, aminophenols, aminonaphthols, dihydroxynaphthalenes, dihydroxy-diphenyl-methane, for example methylene-bis-parabutylphenol or methylene-bis-n-octylphenol, dihydroxydinaphthylmethanes, diamine-dinaphthylethanes, diaminodiphenylmethanes, dihydroxy-diphenylpropanes, pyrogallol, phloroglucine, tetrahydroxynaphthalene, methylenedi-isobornylphenol or the like as well as heterocyclic compounds in which an alkylene oxide may be added to at least one heteroatom, such as piperazine, purine, carbazole, pyrrolidine, thiazolidine, imidazoline, piperidine, tetrahydroquinoline, decahydroquinoline, uracil, and hydrogenation products thereof.

For the preparation of alkyl substitution products of such compounds, there may, for example, be used hydrocarbon halides and unsaturated hydrocarbons such as t-butylchloride, n-octylchloride, tripropylene, decene, and camphene. The alkylation may be carried out in known manner in the presence of known esterification catalysts such as boron trifluoride and aluminum chloride. As alcohol components there may, for example, be used compounds corresponding to the formula

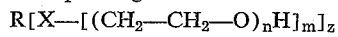

in which R, X, $n$, $m$, and $z$ have the meaning given above.

The properties of the waxes obtained by the process according to the invention depend to a large extent on the alkyl component and the degree of oxalkylation. When, for example, a montan wax acid is esterified with para-tertiary-butylphenol which has been oxalkylated with 1 mole of ethylene oxide per hydroxyl group, very hard, finely crystalline waxes are obtained whereas when di-isobornyl resorcinol which has been oxalkylated with 10 moles of ethylene oxide per hydroxyl group is esterified with the same montan wax acid, soft, very adhesive products which are suitable as covering waxes are obtained.

Considerably harder waxes are obtained when the free reactive hydrogen atoms of the oxalkylated and, if desired, alkylated aromatic oxy-compounds, above all those that are in ortho- or para-position to the phenolic hydroxyl group, are condensed with formaldehyde. After the esterification with the above-mentioned organic acids, finely crystalline, light yellow to brown waxes are formed which, owing to their gloss-producing properties, their hardness, their excellent oil-binding properties and their capacity of forming pastes, can advantageously be applied for the preparation of shoe polishes, floor polishes, and automobile polishes. The products can furthermore be completely emulsified both with ionic and non-ionic emulsifiers, a property which is of special importance for the preparation of bright drying polish emulsions.

Because of their good soot-absorbing properties products of the aforesaid kind can also be applied for the preparation of carbon papers.

The waxes obtained according to the invention can also be used as additions to other waxes, such as those prepared from refined montan wax, for example by esterification, to increase considerably the hardness of these products. The mixtures can also be prepared in one operation by reacting, for example, montan wax acids or behenic acid and the like with a mixture of the ethoxylation products and aliphatic glycols and/or aromatic dimethylols and/or polymethylols above described, whereupon products containing a certain proportion of the oxalkylation component and possessing particular properties are obtained. The constitution of a wax so obtained is, of course, different from that of a wax prepared by mixing products obtained from refined montan wax and products of the above formula with each other, but this is not necessarily of great importance with respect to the industrial use of the waxes. The oxalkylation component used according to the invention is suitably used in a proportion amounting to at least 20 mole percent, and preferably 30 to 70 mole percent, of the alcohol mixture. In certain cases there may be used a smaller proportion than 20 mole percent or a larger proportion than 70 mole percent.

The molecular proportion of the reactants used may vary within wide limits without substantially impairing the properties mentioned above. For example, 1.5 to 0.7 equivalents of the bis- or poly-($\beta$-oxalkyl)-compounds mentioned above and/or mixtures thereof with aliphatic glycols and/or aromatic dimethylols may be reacted with one equivalent of the wax acids used. If the products obtained contain an excess of hydroxyl or acid functions they can be further modified. For example, the free fatty or wax acids still present in the wax obtained may be converted into salts by treating them with alkaline earth metals or other bases such as lithium, magnesium, calcium, barium, strontium, zinc, triethanolamine or morpholine or a mixture of such substances. The salts can be prepared by subjecting the substances either to a direct neutralization with the hydroxides or by exposing them in the melt to the action of compounds having an alkaline reaction such as magnesium acetate.

Furthermore the hydroxyl groups that have not been reacted during the esterification can be reacted with di-isocyanates. As di-isocyanates there may, for example, be used toluylene di-isocyanate, cyclohexylene para-di-isocyanate, 4.4'-dicyclo-hexylmethane di-isocyanate, hexamethylene di-isocyanate, for example hexamethylene 1.6-di-isocyanate, 1.4-diphenyl-methane di-isocyanate or the mixtures thereof or other di-isocyanates of the aliphatic, cycloaliphatic or aromatic series.

In special cases, the properties of the waxes obtained by the process of the invention can be improved by the addition of, for example, calcium soaps, aluminum soaps, zinc soaps, magnesium soaps or mixtures thereof, for example the stearates, behenates or montanates. These soaps can also be produced in the wax mixture by partial saponification by means of salts of these metals, for example magnesium and/or zinc acetate.

As fatty acid or wax acid components suitable for the preparation of the waxes of the invention, there are advantageously used the wax acids obtained by bleaching montan waxes with chromic acid. There may also be used as acid components other natural or synthetically prepared fatty acids and wax acids provided they have a chain of more than 18 carbon atoms, such as behenic acid, cerotic acid, carnauba wax acids or acids obtained by the oxidation of paraffin wax and mixtures of these acids.

The esterification may be carried out in a melt or in a solvent and the solvents may be used simultaneously as entraining agents for the water formed during the reaction. In order to accelerate the reaction, the usual esterification catalysts, for example, sulfuric acid, phosphoric acid, and para-toluene-sulfonic acid may be added. It may also be of advantage to use a protective gas to prevent oxidation, for example, nitrogen or carbon dioxide.

The following examples serve to illustrate the invention but they are not intended to limit it thereto, the parts being by weight.

*Example 1*

412.0 parts (1.0 equivalent) of a montan wax acid obtained by bleaching with chromic acid were heated in a vessel fitted with stirring means at 120 to 140° C., while introducing nitrogen, with 96.5 parts (0.1 equivalent) of resorcinol-bis-($\beta$-hydroxyethyl)-ether and 0.6 part of sulfuric acid of 20% strength until the acid value had decreased to 20 to 21.

A light brown wax of an extraordinary hardness and a good compatability with paraffin and a flow point/drop point (according to Ubbelohde) of 81/81.5° C. was obtained.

*Example 2*

(a) By the esterification of 412.0 parts (1.0 equivalent) of montan wax acid with 67.5 parts (0.7 equivalent) of resorcinol-bis-($\beta$-hydroxyethyl)-ether in the presence of 0.5 part of sulfuric acid of 20% strength in a manner analogous to that described in Example 1, there was obtained a light brown, extraordinarily hard wax having an acid value of 48 to 50, a flow point/drop point of 80.5/81° C., a good compatability with paraffin and an unusually great capacity of forming pastes.

(b) By reacting the wax so obtained with 3.24% of calcium hydroxide at 130° C. a hard wax was obtained which had an acid value of 12 and a flow point/drop point of 104.5/105.5° C. and which likewise exhibited a good capacity of forming pastes.

*Example 3*

By esterifying 412.0 parts (1.0 equivalent) of montan wax acid in the manner described in Example 1 with 146.0 parts (1.5 equivalents) of pyrocatechol-bis-($\beta$-hydroxyethyl)-ether and 0.6 part of sulfuric acid of 20% strength, a light-colored, very hard wax having an acid value of 6 and a flow point/drop point of 88/89° C. was obtained.

*Example 4*

By treating 412.0 parts (1.0 equivalent) of montan wax acid and 67.5 parts (0.7 equivalent) of pyrocatechol-bis-($\beta$-hydroxyethyl)-ether in the manner described in Example 2a, there was obtained a light brown wax having an acid value of 54 and a flow point/drop point of 79/80° C. which, in addition to a high degree of hardness, possessed a good compatability with paraffin, a good capacity of forming pastes and very good oil-binding properties. On partial saponification with 3.6% of $Ca(OH)_2$ in the manner described in Example 2b the wax yielded a product having an acid value of 18 and a flow point/drop point of 103/104° C. and which with regard to hardness and oil-binding properties excelled comparable waxes having merely aliphatic alcohol components.

*Example 5*

412.0 parts (1.0 equivalent) of montan wax acid were esterified at 130 to 140° C., while stirring, with 109.0 parts (0.7 equivalent) of the bis-($\beta$-hydroxyethyl)-ether of bisphenol A (bisphenol A=2.2-[4.4'-dihydroxy-diphenyl]-propane) in the presence of 0.6 part of sulfuric acid of 20% strength in an atmosphere of nitrogen, until the acid value was 35. A light brown wax was obtained which had a flow point/drop point of 79/80° C., an extraordinary hardness, good oil-binding properties, a very good capacity of forming pastes and very good gloss-producing properties and which with regard to these properties even excelled the waxes mentioned in Examples 1 to 4.

By reacting this wax at 130° C., while stirring intensively, with 2.35% of calcium hydroxide, a very hard wax was obtained which had a very good compatability with paraffin and good oil-binding properties and which was very suitable for use in the preparation of wax pastes having excellent gloss-producing properties.

*Example 6*

412 parts (1.0 equivalent) of montan wax acids were esterified in the manner described in Example 1 with 171.3 parts (1.0 equivalent) of the bis-diglycol ether of 4,4'-diamino-dicychlohexylmethane in the presence of 0.3 part of sulfuric acid of 20% strength. There was obtained a yellow hard wax which was viscous in the molten mass and had the following characteristic values: Acid value 2.0, saponification value 108, flow point/drop point 76.5/77.0° C.

*Example 7*

In a frit tube electrically heated to 170° C., 412.0 parts (1 equivalent) of montan wax acids were esterified in the presence of 0.5 part of magnesium oxide, while introducing nitrogen, with 134.2 parts (1.0 equivalent) of the reaction product from benzidine and 8 moles of ethylene oxide. A particularly hard wax having the following characteristic values was obtained: Acid value 16.0, saponification value 143, flow point/drop point 84.0/85.5° C.

*Example 8*

In a frit tube electrically heated to 150° C., 412.0 parts (1.0 equivalent) of montan wax acids were esterified in the presence of 0.4 part of sulfuric acid of 20% strength, while introducing nitrogen, with 84.0 parts (1.0 equivalent) of the N.N.O-tri-($\beta$-hydroxyethyl)-para-aminophenol obtained from para-amino-phenol and 3 moles of ethylene chlorhydrine or 3 moles of ethylene oxide. There was obtained a yellow hard wax having the following characteristic values: Acid value 17.0, saponification value 137, flow point/drop point 76.0/76.5° C.

*Example 9*

In an electrically heated frit tube through which nitrogen was passed 412 grams of a wax acid mixture having an acid value of 135 and obtained by bleaching montan wax were esterified at 170° C. in the presence of 0.5 gram of magnesium oxide with 93.5 grams of a product obtained by the addition reaction of 4 moles of propylene oxide with 1 mole of benzidine. A very hard wax having the following characteristic values was obtained: Acid value 25.0, saponification value 133.5, flow point/drop point 80.5/81.8° C. At 20° C. the wax had a very high degree of hardness. A wax paste prepared by dissolving 7 parts of the wax so obtained and 18 parts of a paraffin mixture in the hot in 75 parts of a solvent for wax based on hydrocarbons had a very bright surface and a hardness of 2450 g./cm.$^2$ at 20° C.

Pastes prepared from 3 parts of the wax mentioned above and 22 parts of a paraffin mixture were still very hard.

*Example 10*

In a vessel fitted with stirring means and rinsed with a current of inert gas 824 grams of the wax acid mixture mentioned in Example 9 were esterified at 150° C. in the presence of 0.4 cc. of sulfuric acid of 20% strength with 176 grams of bis-oxyethyl-piperazine. A hard wax was obtained which had the following characteristic values. Acid value 11.9, saponification value 151.2, flow point/drop point 71/73° C. The technical properties of the wax were similar to those of the wax obtained according to Example 9.

*Example 11*

412 parts (1.0 equivalent) of montan wax acid having an acid value of 137 were esterified in the manner described in Example 1 at 100 to 150° C. in the presence of 0.6 part of sulfuric acid of 20% strength while introducing nitrogen, with 158 parts (1.25 equivalents) of methylene-bis-($\beta$-hydroxyethylnaphthalene)-ether.

A light brown very hard wax formed which had the following characteristic values: Acid value 20, saponification value 107, flow point/drop 89/90° C.

*Example 12*

500 parts (1.0 equivalent) of a mixture oxidized with chromic acid and consisting of 50% of crude montan wax freed from resin and 50% of synthetically prepared paraffin wax oxidized by air were esterified in the manner described in Example 1, in the presence of 0.6 part of sulfuric acid of 20% strength with 97 parts (0.7 equivalent) of the bis-($\beta$-hydroxypropyl)-ether of resorcinol. A light brown product was obtained which was distinguished by a particularly good compatability with paraffin and a particularly good capacity of forming pastes and which was consequently applicable to the manufacture of wax pastes. Characteristic values: Acid value 33, saponification value 117, flow point/drop point 95/96° C.

*Example 13*

(a) By esterifying 412 parts (1.0 equivalent) of bleached montan wax acid in the manner described in Example 1 with 165 parts (0.7 equivalent) of an ethoxylated mixture of nonyl- and dinonyl resorcinol and 0.7 part of sulfuric acid of 20% strength, a very hard finely crystalline wax was obtained which had an acid value of 46 and possessed a good capacity of forming pastes.

(b) By reacting the wax so obtained with 4% of calcium hydroxide a very hard product was obtained which had an acid value of 10, a saponification value of 91, a flow point/drop point of 98/104° C. and which likewise possessed a good capacity of forming pastes.

*Example 14*

412 parts (1.0 equivalent) of bleached montan wax acid were esterified with 400 parts (1.0 equivalent) of the reaction product from 2 moles of ethylene oxide and 1 mole of 4.4'-dihydroxydiphenyl-propane in the presence of 0.6 part of sulfuric acid of 20% strength, while introducing nitrogen until the acid value had decreased to 22. Saponification value 101, flow point/drop point 75/76° C.

*Example 15*

412 parts (1.0 equivalent) of a wax acid having an acid value of 137 and obtained by bleaching crude montan wax with chromic acid were esterified in a vessel fitted with stirring means at 120 to 170° C. with 172 parts (0.8 equivalent) of ethoxylated methylene-bis-(para-butylphenol) and 0.7 part of sulfuric acid of 20% strength. There was obtained a light yellow very bright wax which could be completely emulsified both with ionic and non-ionic emulsifiers and was consequently particularly well suitable for the manufacture of bright drying polish emulsions. In addition to its good gloss-producing properties the wax so obtained had an extraordinarily high degree of hardness and was considerably superior to that of natural waxes such as carnauba wax.

*Example 16*

500 parts (1.0 equivalent) of a mixture oxidized with chromic acid and consisting of 50% of crude montan wax freed from resin and 50% of synthetically prepared paraffin wax oxidized by air were esterified in the manner of Example 15 in the presence of 0.7 part of sulfuric acid of 20% strength with 222 parts (0.8 equivalent) of the reaction product from 2 moles of ethylene oxide and 1 mole of methylene-bis-(n-octylphenol).

The wax so obtained had a very high degree of hardness and the following characteristic values: Acid value 29, saponification value 98, flow point/drop point 90/91° C. Owing to its excellent compatability with paraffin the wax can advantageously be applied for the manufacture of wax pastes.

*Example 17*

(a) In an electrically heated frit tube 412 parts (1.0 equivalent) of bleached montanic acid were esterified, while introducing a strong current of nitrogen, with 210 parts (0.7 equivalent) of ethoxylated di-isobornyl resorcinol in which on an average 1 mole of ethylene oxide had been added to every hydroxyl group and 0.6 part of sulfuric acid of 20% strength serving as catalyst.

A brown product formed which was particularly suitable as material to be admixed with the usual floor polishes in order to render them tread-proof. Characteristic values: Acid value 38, saponification value 103, flow point/drop point 77/78° C.

(b) By using a hydrogenated di-isobornyl resorcin, while otherwise proceeding in the same manner, a light-colored wax was obtained which had the following characteristic values: Acid value 23, saponification value 122, flow point/drop point 76/77° C.

*Example 18*

By esterifying in the manner described in Example 17 412 parts (1 equivalent) of bleached crude montan wax with a mixture of 31 parts (0.5 equivalent) of glycol and 147 parts (0.5 equivalent) of ethoxylated di-isobornyl resorcinol, a hard wax was obtained which likewise possessed good tread-proof properties. Characteristic values: Acid value 24, saponification value 115, flow point/drop point 78/79° C.

*Example 19*

By esterifying 406 parts (1.0 equivalent) of montanic acid bleached with chromic acid with 624 parts (1.0 equivalent) of di-isobornyl resorcinol which had been ethoxylated with 10 moles of ethylene oxide per hydroxyl group, a ductile wax was obtained which could be used with special advantage as lubricating wax and had the following characteristic values: Acid value 21, saponification value 68, flow point/drop point 80/81° C.

*Example 20*

By esterifying in the manner described in Example 1 500 parts (1.0 equivalent) of a mixture oxidized with chromic acid and consisting of 50% of deresinified crude montan wax and 50% of synthetically prepared paraffin wax oxidized with air, with 570 parts (1.0 equivalent) of the reaction product from 2 moles of ethylene oxide and 1 mole of methylene-bis-(di-isobornylphenol), and 0.6 part of sulfuric acid of 20% strength, a light brown very hard wax was obtained which was well compatible with paraffin and possessed good oil-binding properties. Characteristic values: Acid value 28, saponification value 92, flow point/drop point 92/93° C.

*Example 21*

412 parts (1.0 equivalent) of a montan wax acid obtained by bleaching with chromic acid and having an acid value of 137 were esterified in the manner described in Example 1, in the presence of 0.6 part of sulfuric acid of 20% strength, while introducing nitrogen, with 230 parts (1.0 equivalent) of an ethoxylation product of a mixture obtained by the addition reaction of 2 moles of phenol with alpha-terpinene.

The product so obtained had the following characteristic values: Acid value 38, saponification value 102, flow point/drop point 77/78° C.

*Example 22*

294 parts of montanic acid obtained by the oxidation of crude montan wax with chromic acid were esterified at 100 to 150° C. in the presence of 0.7 part of sulfuric acid of 20% strength with 200 parts of butoxylated 4.4'-dihydroxydiphenylpropane until the acid value was 36. The product had the following characteristic values: Saponification value 103, flow point/drop point 78° C.

We claim:

1. A wax-like ester of fatty acids of more than 18 carbon atoms as the acid component and, as the alcohol component, a compound selected from the group consisting of 2.2-(4.4'-dihydroxy-diphenyl)-propane, resorcinol, pyrocatechol, hydroquinone, 4.4'-diamino-dicyclohexylmethane, benzidine, p-aminophenol and piperazine, at least one hydrogen atom bound to an atom selected from the group consisting of oxygen and nitrogen atoms of that compound being substituted by a radical of the formula $$-(R'-O)_nH$$

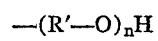

wherein R' stands for an alkylene radical containing at least 2 carbon atoms in a straight chain and containing from 2 to 4 carbon atoms and $n$ is an integer from 1 to 12, said alcohol component being present in an amount of 0.7 to 1.5 equivalents for each equivalent of the acid component.

2. The ester of claim 1 wherein $n$ is an integer from 1 to 8.

3. A wax-like ester of fatty acids of more than 18 carbon atoms as the acid component and as the alcohol component, a mixture of (1) up to 80 mol percent of at least one alcohol having 2 to 3 alcoholic hydroxyl groups and (2) 100–20 mol percent of a compound selected from the group consisting of 2.2-(4.4'-dihydroxy-diphenyl)-propane, resorcinol, pyrocatechol, hydroquinone, 4.4'-diamino-dicyclohexylmethane, benzidine, p-aminophenol and piperazine, at least one hydrogen atom bound to an atom selected from the group consisting of oxygen and nitrogen atoms of that compound being substituted by a radical of the formula $$-(R'-O)_nH$$

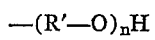

wherein R' stands for an alkylene radical containing at least 2 carbon atoms in a straight chain and containing from 2 to 4 carbon atoms and $n$ is an integer from 1 to 12, said alcohol component being present in an amount of 0.7 to 1.5 equivalents for each equivalent of the acid component.

4. The ester of claim 3 wherein the alcohol (1) is present in an amount of 30 to 70 mol percent.

5. The ester of claim 3 wherein the alcohol (1) consists at least in part of dimethylol compounds of aromatic nuclei.

6. The ester of claim 5 wherein said alcohol (1) consists at least in part of polymethylol compounds of aromatic nuclei containing 3 methylol groups.

7. The ester of claim 1 wherein nonconverted carboxylic acid groups are at least partially neutralized.

8. The ester of claim 1 which additionally contains metals bound to carboxylic groups and being selected from metals of the group consisting of calcium, aluminum, zinc, and magnesium.

9. The ester of claim 1 wherein nonconverted hydroxyl groups are reacted with a diisocyanate of hydrocarbon.

10. A wax-like ester of montanic acids as the acid component and, as the alcohol component, a compound selected from the group consisting of 2.2-(4,4'-dihydroxy-diphenyl)-propane, resorcinol, pyrocatechol, hydroquinone, 4.4'-diamino-dicyclohexyl-methane, benzidine, p-aminophenol and piperazine, at least one hydrogen atom bound to an atom selected from the group consisting of oxygen and nitrogen atoms of that compound being substituted by a radical of the formula $$-(R'-O)_nH$$

wherein R' stands for an alkylene radical containing at least 2 carbon atoms in a straight chain and containing from 2 to 4 carbon atoms and $n$ is an integer from 1 to 12, said alcohol component being present in an amount of 0.7 to 1.5 equivalents for each equivalent of the acid component.

11. The ester of claim 10 wherein R' is an ethylene radical.

12. A wax-like ester of fatty acids of more than 18 carbon atoms as the acid component and as the alcohol component a compound of the formula

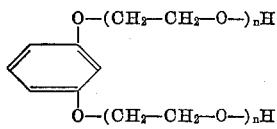

wherein $n$ is an integer from 1 to 12, said alcohol component being present in an amount of 0.7 to 1.5 equivalents for each equivalent of the acid component.

13. A wax-like ester of fatty acids of more than 18 carbon atoms as the acid component and as the alcohol component a compound comprising ethoxylated diisobornyl substituted resorcinol in which 1 to 12 ethylene oxide groups are added to each hydroxyl group of said substituted diphenol.

14. A process for the manufacture of wax-like esterification products which comprises contacting at an elevated temperature at least one carboxylic acid containing more than 18 carbon atoms with a compound selected from the group consisting of 2.2-(4,4'-dihydroxy-diphenyl)-propane, resorcinol, pyrocatechol, hydroquinone, 4.4'-diamino-dicyclohexylmethane, benzidine, p-aminophenol and piperazine, at least one hydrogen atom bound to an atom selected from the group consisting of oxygen and nitrogen atoms of that compound being substituted by a radical of the formula $$-(R'-O)_nH$$

wherein R' stands for an alkylene radical containing at least 2 carbon atoms in a straight chain and containing from 2 to 4 carbon atoms, and $n$ is an integer from 1 to 12, said alcohol component being present in an amount of 0.7 to 1.5 equivalents for each equivalent of the acid component.

References Cited in the file of this patent
UNITED STATES PATENTS

| | | |
|---|---|---|
| 2,499,360 | De Groote et al. | Mar. 7, 1950 |
| 2,552,321 | Jayne et al. | May 8, 1951 |
| 2,687,430 | Snow et al. | Aug. 24, 1954 |
| 2,821,484 | Kolling et al. | Jan. 28, 1958 |